United States Patent Office 3,213,068
Patented Oct. 19, 1965

3,213,068
COPOLYMERS OF DINITRILE OXIDES AND DIFUNCTIONAL COMONOMERS HAVING ACETYLENIC AND ETHYLENIC UNSATURATION
Everett J. Frazza, Westchester, N.Y., assignor to American Cyanamid Company, Stamford, Conn., a corporation of Maine
No Drawing. Filed Apr. 2, 1962, Ser. No. 184,528
18 Claims. (Cl. 260—79.3)

This invention relates broadly to new and useful copolymers and, more particularly, to copolymers of a dinitrile oxide and at least one other unsaturated (ethylenic and/or acetylenic unsaturated) material which is copolymerizable with the dinitrile oxide.

Still more particularly the present invention is concerned with compositions comprising a copolymer of copolymerizable ingredients including (1) a divalent radical represented by the general formula (I)        ONC—Ar—CNO wherein Ar represents a divalent radical hereafter more specifically defined and (2) an unsaturated organic material containing at least two reactive sites of the group consisting of ethylenic and acetylenic bonds; that is to say, at least two pairs of adjacent carbon atoms having at least two bonds between each of the said adjacent carbon atoms. In the above formula Ar represents a divalent radical selected from the class consisting of divalent unsubstituted aromatic hydrocarbon radicals, divalent halogenated aromatic hydrocarbon radicals and divalent lower alkyl-substituted aromatic hydrocarbon radicals. Each —CNO group in the aforementioned formula is bonded directly through its carbon to a carbon atom of the aromatic nucleus.

The copolymers of this invention are useful, for example, as molding (moldable) compositions, or as modifiers of conventional molding compositions. They also can be used as modifiers of, or additives to, natural or synthetic resins of all kinds, oils and the like. These new copolymers are characterized by the fact that they contain an isoxazoline ring, (II)

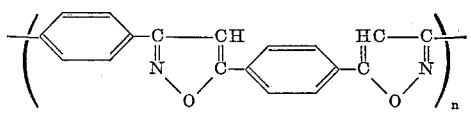

and/or an isoxazole ring, (III)

in the backbone or linear chain of the polymer.

For example, taking a benzenedinitrile oxide, specifically 1,4-benzenedinitrile oxide, as illustrative of the compound embraced by Formula I, and divinylsulfone as illustrative of the unsaturated comonomer, the resulting copolymer comprises essentially or consists essentially (depending, for example, upon the relative proportions of the comonomers) of the recurring unit represented by the formula (IV)

The $n$ in the above formula has an average value of, for example, from 2 to 1500 or more.

As another example, again taking 1,4-benzenedinitrile oxide as a specific example of the compound embraced by Formula I and a diethynylbenzene, specifically p-diethynylbenzene, as illustrative of the unsaturated comonomer, the resulting copolymer comprises essentially or consists essentially (depending, for instance, upon the relative proportions of the comonomers) of the recurring unit represented by the formula (V)

In this example, too, the $n$ in Formula V has an average value of, for instance, from 2 to 1500 or more.

Illustrative examples of divalent aromatic radicals represented by Ar in Formula I are: (A) phenylene, indenylene and the various chlorinated, brominated and lower alkyl-substituted (e.g., methyl- through amyl-substituted, both normal and isomeric forms) phenylenes and indenylenes including, for example, the various mono- and dichloro-, mono- and dibromo-, and mono- and dimethyl- through diamylphenylenes, and -indenylenes; (B) biphenylene, naphthylene and the various chlorinated brominated and lower alkyl-substituted biphenylenes and naphthylenes wherein the substituents include those mentioned under (A), supra, and additionally include, for example, the tri- and tetrachloro-, the tri- and tetrabromo-, and the tri- and tetra-(lower alkyl-substituted)biphenylenes and -naphthylenes; and (C) benzonaphthylene, anthrylene, phenanthrylene, fluoroenylene and the various chlorinated, brominated and lower alkyl-substituted benzonaphthylenes, anthrylenes, phenanthrylenes and fluoroenylenes wherein the substituents include those mentioned under (A) and (B) supra, and additionally include, for example, the pentachloro-, pentabromo- and penta-(lower alkyl-substituted)-benzonaphthylenes, anthrylenes, phenanthrylenes and fluorenylenes.

It will be understood, of course, by those skilled in the art that, in the above illustrative examples of substituted divalent aromatic radicals represented by Ar in Formula I, as well as in other formulas herein where Ar appears, the degree of substitution in all cases is such that there can be two nitrile oxide, —CNO, groups bonded through a carbon atom of the said group directly to a carbon atom of the aromatic nucleus. Otherwise (i.e. other than in the two positions for the two —CNO groups) the aromatic nucleus can be completely substituted with Cl, Br or a lower alkyl group if the dinitrile oxide is soluble at least to some extent in a selected inert solvent in which copolymerization is effected with the difunctional monomer.

PREPARATION OF DINITRILE OXIDES

The aromatic dinitrile oxides used in practicing the present invention can be prepared in accordance with the following indicated procedures:

(VI)

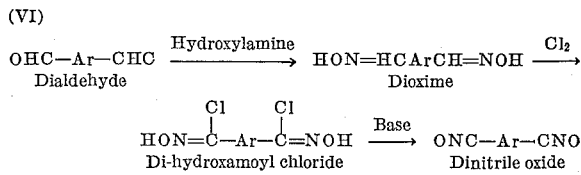

Ar in the foregoing formulas indicated by VI has the same meaning as given above with reference to Formula I.

The aromatic dialdehyde is treated with hydroxylamine to obtain the corresponding dioxime. Chlorination of the latter with chlorine gas in chloroform, carbon tetrachloride or acetic acid gives the corresponding di-hydroxamoyl chloride, which is then suspended or dissolved in an inert organic solvent and treated with a base to obtain the corresponding dinitrile oxide. A variety of bases, such as tertiary aliphatic amines (e.g., a trialkyl amine, including the triethyl, -propyl and -butyl amines), pyridine, aqueous alkali-metal (sodium, potassium, lithium, etc.), hydroxides or carbonates, etc., can be used.

In the last step it is advantageous to use, as the liquid reaction medium, solvents that do not dissolve the desired reaction product, i.e., the aromatic dinitrile oxide. This is because dimerization of nitrile oxides, to furoxanes, e.g., (VII)

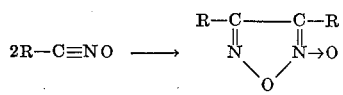

or to poly-furoxanes when making a dinitrile oxide, occurs more slowly in the solid state (see Example 1 illustrating more specifically the preparation of 1,4-benzenedinitrile oxide). However, solvents that do dissolve the dinitrile oxide end product can be used, if desired, providing the reaction mass is kept sufficiently cold to prevent appreciable self-condensation of the dinitrile oxide (see Example 2 illustrating more specifically the preparation of 1,3-benzenedinitrile oxide).

PREPARATION OF COPOLYMERS

The copolymers of this invention are prepared, for example, by dissolving the difunctional unsaturated comonomer in a suitable inert (substantially completely inert) liquid reaction medium. Dimethylformamide is the preferred liquid reaction medium or solvent. The liquid reaction medium should be one which is inert (i.e., substantially non-reactive) with respect to the dinitrile oxide, the unsaturated monomer and the copolymer. Also, it should be one in which the dinitrile oxide is soluble at least to some extent, and preferably either completely or to a substantial degree.

The following examples are illustrative of some of the inert liquid reaction media that can be used, it being understood, of course, that the chosen reaction medium is selected on the basis of its suitability in the preparation of a particular copolymer, e.g., its degree of solvation on the particular dinitrile oxide reactant, etc.: N,N-diethylformamide, N,N-dimethylacetamide, etc.; ethers, e.g., diethyl ether, di-n-propyl ether, di-isopropyl ether, di-n-butyl ether, di-n-amyl ether, the mixed normal and isomeric diamyl ethers, methyl butyl ether, diglycoldimethyl ether, tetrahydrofuran, tetrahydro-2-methylfuran, m-dioxane (1,3-dioxane), p-dioxane (1,4-dioxane), pentamethylene oxide, 2 - methyl - 1,3-dioxolane, N-methylmorpholine, N-ethylmorpholine, etc.; ketones, e.g., acetone, diethyl and the various other di-(lower alkyl) ketones, including both the normal and various isomeric forms, e.g., the normal and various isomeric dibutyl and diamyl ketones, methyl ethyl ketone, methyl propyl ketone, methyl butyl ketone, methyl amyl ketone, ethyl amyl ketone, methyl benzyl ketone, ethyl benzyl ketone, methyl phenyl ketone (acetophenone), etc.; tertiary-butyl alcohol; halogenated hydrocarbons, including chlorinated hydrocarbons, brominated hydrocarbons, etc., e.g., chloroform, carbon tetrachloride, methylene dichloride, methylene dibromide, 1,1-dichloroethane, 1,1-dibromoethane, 1,1,1-trichloroethane, 1,2-dichloropropane, 1,2-dibromopropane, 1,3-dichloropropane, 1,3-dibromopropane, trimethylene dichloride, trimethylene dibromide, o-, m- and p-dichloro- and dibromobenzenes, monochloro- and monobromobenzenes, etc. Other examples will be apparent to those skilled in the art from the foregoing illustrative examples. Preferably the liquid reaction medium is one that boils below 200° C., and usually is one which boils below about 150° C., more particularly below about 100° C. Also, preferably, the liquid reaction medium is one which is volatile (volatilizable) with decomposition.

As has been indicated hereinbefore, the liquid medium in which the copolymerization reaction is effected should be inert (substantially completely inert) during the reaction. By "inert" or "substantially completely inert," liquid, reaction medium is meant one which is so inert or nonreactive toward the reactants and the reaction product that it will not adversely affect the course of the reaction or the constitution of the reaction product. By "liquid reaction medium" is meant one which is liquid at the temperature and pressure employed in effecting the reaction. In other words, the inert, liquid, reaction medium may or may not be a liquid at room temperature or at any other temperature below the reaction temperature.

The ratio of the solvent to the total amount of reactants used is not critical, but it may be noted that with the less soluble dinitrile oxides and/or with the less soluble copolymers that are formed, a higher dilution of the reactants in the solvent favors the production of copolymers of higher molecular weight.

Various inhibitors of vinyl- or ethylenic-type polymerization reactions, e.g., diphenyl amine, phenyl-α-naphthylamine, N,N'-di-2-naphthyl-p-phenylenediamine, certain cupric salts, e.g., cupric acetate, etc., may be added when the difunctional comonomer is a homopolymerizable diolefin in order to obviate or minimize the homopolymerization of the diolefin. The amount of the polymerization inhibitor may be considerably varied, but ordinarily it is employed in an amount not exceeding 3%, generally less than 1%, e.g., from 0.01% to 0.5%, by weight of the diolefin comonomer.

The proportions of dinitrile oxide and the difunctional comonomer can be considerably varied as desired or as conditions may require. If one uses a large excess of dinitrile oxide over the chemically equivalent amount of the difunctional comonomer, e.g., 1.2 to 5.0 chemical equivalents of the former per chemical equivalent of the latter, then one will obtain a copolymer containing furoxane rings along with isoxazoline and/or isoxazole rings (the nature of the latter two rings depending upon the particular comonomer employed). On the other hand, if one uses an excess of the difunctional comonomer, specifically a diolefin comonomer, over the chemically equivalent amount of the dinitrile oxide, e.g., 1.2 to 2.0 chemical equivalents of the former per chemical equivalent of the latter, then one obtains a relatively low-molecular-weight copolymer with ethylenically unsaturated, e.g., $CH_2=C<$, end groups. The characteristics of such a copolymer can be modified by cross-linking the copolymer through its terminal $CH_2=C<$ groups by adding a vinyl-type polymerization catalyst or initiator, e.g., an organic or inorganic peroxide, e.g., benzoyl peroxide, acetyl peroxide, etc., azo-bis-isobutyronitrile, etc. Or, if desired, one can modify the copolymer initially obtained and which contains up to two polymerizably unsaturated, e.g., $CH_2=C<$, end groups by copolymerizing it, in the presence of a polymerization catalyst, with at least one other copolymerizable comonomer, e.g., vinyl compounds such as vinyl acetate, vinyl acrylate, acrylonitrile, methyl acrylate, etc., divinyl and diallyl compounds, e.g., divinyl benzene, diallyl phthalate and others such as those mentioned hereinafter; and others well known to those skilled in the art.

In general, however (that is, in the absence of such specific objectives as indicated above), the dinitrile oxide and the difunctional comonomer are employed in the ratio of from 1.0 to 1.1 chemical equivalents of the former per chemical equivalent of the latter.

One suitable method of effecting copolymerization between the dinitrile oxide reactant and the difunctional comonomer is to add the former slowly to a stirred solution of the latter. The rate of addition to the dinitrile oxide to the said solution is largely dependent upon the reactivity of the comonomer. If rapid addition is carried out with a comonomer of relatively low reactivity, e.g., $H_2C=C-(CH_2)_2-C=CH_2$, a build-up of unreactive $-C\equiv NO$ groups occurs. This permits self-condensation to take place and the formation of some furoxane units in the backbone of the polymer chain. Also, it leads to lower-molecular-weight chains with CH≡C— or CH$_2$=C< end groups that can not self-condense any further except as described above by the addition of a polymerization catalyst or by the addition of both a catalyst and at least one other polymerizable comonomer.

With difunctional comonomers containing activating groups (e.g., phenyl, cyano, carbonyl, etc.) attached to the unsaturated groups, faster rates of addition of the dinitrile oxide to the solution of the difunctional comonomer are possible.

The temperature at which the copolymerization reaction is carried out can be varied over a wide range, e.g., from —30° C. to 200° C. or more, depending, for example, upon the particular reactants and liquid reaction medium employed. With certain particular reaction media, e.g., dimethylformamide, the reaction can be readily carried out withiin the preferred range of 10°–40° C.

At the end of the reaction period the copolymer is isolated by conventional technique, e.g., by precipitation with a non-solvent in known manner or by evaporation of the solvent.

OTHER TECHNIQUES FOR MAKING THE COPOLYMER

It is not essential in making the copolymers of this invention that one must use a pre-formed dinitrile oxide of the kind embraced by Formula I as a starting reactant. Instead, the dinitrile oxide reactant can be formed in situ.

For example, a slow in situ-formation of the chosen dinitrile oxide reactant can be effected by first dissolving the corresponding di-hydroxamoyl chloride and the difunctional comonomer in a liquid reaction medium of the kind hereinbefore described. Thereafter a base (examples of which also previously have been given) is added slowly to the reaction mixture. Surprisingly, by-product salt from the freshly generated dinitrile oxide does not interfere with the copolymerization of said oxide with the difunctional comonomer.

Alternatively, one can form the dinitrile oxide in situ by addiing the corresponding di-hydroxamoyl chloride slowly to a solution of the base and the difunctional comonomer, whereby the freshly generated dinitrile oxide copolymerizes with the said comonomer.

EXAMPLES OF DIFUNCTIONAL COMONOMERS

Illustrative examples of difunctional comonomers that can be copolymerized with dinitrile oxides of the kind embraced by Formula I to produce the copolymers of this invention are the various diolefinic materials, e.g., 1,2-butadiene, 1,3-butadiene, 3-methyl-1,2-butadiene, 2-chloro-1,3-butadiene, the various isomeric pentadienes, hexadienes, heptadienes, octadienes, nonadienes and decadienes; the ethylenic or acetylenic unsaturated monohydric alcohol esters of ethylenic or acetylenic unsaturated monobasic acids, more particularly monocarboxylic acids, e.g., the vinyl, allyl, crotyl, 1-chloroallyl, 2-chloroallyl, cinnamyl, 1-phenylallyl, butenyl, oleyl, propargyl, etc., esters of acrylic and alpha-substituted acrylic (including alkacrylic, e.g., methacrylic, ethacrylic, propacrylic, etc., and arylacrylic, e.g., phenylacrylic, etc.), crotonic, cinnamic, oleic, linoleic, propiolic (HC≡C—COOH)

etc., acids; the ethylenic or acetylenic unsaturated monohydric alcohol mono- or diesters of ethylenic or acetylenic unsaturated dibasic acids, more particularly dicarboxylic acids, e.g., mono- and divinyl, mono- and diallyl, mono- and dioleyl, mono- and dipropargyl (and others such as mentioned above with reference to unsaturated monohydric alcohol esters) of fumaric, maleic, citraconic, mesaconic, itaconic, acetylenedicarboxylic, etc., acids; the ethylenic or acetylenic unsaturated monohydric alcohol diesters of aromatic and saturated aliphatic dibasic, more particularly dicarboxylic acids, e.g., the divinyl, diallyl, dicrotyl, dipropargyl (and others such as indicated above with reference to esters of other acids) esters of oxalic, malonic, succinic, glutaric, adipic, pimelic, suberic, azelaic, sebacic, phthalic, terephthalic, isophthalic, benzoylphthalic, etc., acids; and the mixed saturated and unsaturated monohydric alcohol diesters of ethylenically or acetylenically unsaturated dibasic acids (examples of which have been given above), e.g., monobutyl monovinyl maleate, monoethyl monoallyl fumarate, etc.

Other examples include the difunctional cyclic compounds, e.g., the divinyl, diallyl, dimethallyl, etc., benzenes, toluenes, naphthalenes, cyclohexanes, cycloheptanes, pyridines, halogeno-(e.g., chloro-, bromo-, etc.)-benzenes, -toluenes, -naphthalenes, etc.; difunctional ethers, e.g., diallyl ether, dimethallyl ether, etc.; difunctional ketones, e.g., diallyl ketone; difunctional amides, e.g., N-allyl and -methallyl acrylamides and methacrylamides, methylene bis-acrylamide and -methacrylamide; divinyl- and diallylsulfones; the ethylenic or acetylenic unsaturated monobasic, more particularly monocarboxylic acid diesters of the diols, e.g., the acrylic, methacrylic, ethacrylic, propiolic (and other unsaturated monobasic acids such as mentioned in the preceding paragraph) diesters of a diol, e.g., ethylene glycol, diethylene glycol, propylene glycol, dipropylene glycol, triethylene through decaethylene glycol, hexamethylene through decamethylene glycol, propenylene glycol, butenylene glycol, 2-ethyl-1,3-hexanediol, 1,3-butylene glycol, 2-butyl-1,3-octanediol, 2-ethyl-2-butyl-1,3-propanediol, 1-methyl-3-isobutyl-1,3-propanediol, di-hydroxyethyl)melamine, di-(hydroxypropyl)melamine, etc.

Still other examples of difunctional comonomers wherein the unsaturation or functionality is due primarily to ethylenic unsaturation and which can be used in practicing the present invention are described in many issued patents and publications including, for example, Kropa U. S. Patent No. 2,510,503 dated June 6, 1950.

Examples of difunctional comonomers containing acetylenic unsaturation, in addition to those indicated in the foregoing, are the various diethynylbenzenes, -toluenes and -xylenes; and diethynyl compounds represented by the general formula (VIII)     HC≡C—(CH$_2$)$_n$—C≡CH where $n$ represents a number from 0 to about 10. Other examples are the liquid, linear polymeric materials represented by the general formula (IX)     R—C≡C—(X)$_n$—Y wherein R represents a monovalent radical selected from the group consisting of alkyl, dialkylaminoalkyl and cycloalkyl radicals each having from 1 to 18 carbon atoms in each hydrocarbon grouping thereof; X represents a divalent radical selected from the group represented by the general formula (X)     —CR′=CH— and (XI)     —CH=CR″— wherein R′ and R″ are each the same monovalent radical selected from the group defined above with respect to R, and each is the same radical from the said group as is the radical represented by R; Y represents a monovalent radical selected from the group represented by the general formulas (XII)     —CH=CHR‴ and (XIII)     —CR″″=CH$_2$ wherein R‴ and R″″ are each the same monovalent radical selected from the group defined above with respect to R, and each is the same radical from the said group as are the radicals represented by R, R′ and R″; and $n$ represents a number having an average value ranging from 1 to about 6, inclusive. Such materials, which contain both ethylenic and acetylenic unsaturation in the molecule, are disclosed and claimed in Meriwether U.S. Patent No. 2,961,330, dated November 22, 1960, and wherein is fully described a method of preparing these materials.

The difunctional comonomer that is employed in practicing the present invention is preferably one which contains terminal $CH_2=C<$ or $CH\equiv C-$ groups.

In order that those skilled in the art may better understand how the present invention can be carried into effect, the following examples are given by way of illustration and not by way of limitation. All parts and percentages are by weight unless otherwise stated.

Examples 1 and 2 are given in order to illustrate more specifically how the dinitrile oxides used in practicing this invention can be prepared.

Example 1

PREPARATION OF 1,4-BENZENEDINITRILE OXIDE (XIV)

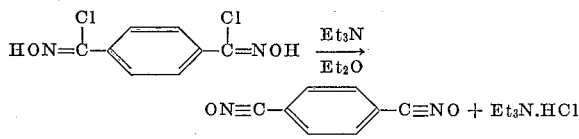

A solution of 14 g. of terephthalhydroxamoyl chloride in 210 ml. of ether (diethyl ether) is added over a period of 10 minutes to a well-stirred solution of 18.3 g. of triethylamine in 560 ml. of ether. The temperature of the reaction mixture is held below 2° C. with an ice-salt cooling bath. After stirring for an additional 10 minutes, 50 ml. of ice water is added to the pasty reaction mass and stirring is continued for 30 minutes more.

The precipitate that forms is filtered off, washed thoroughly with alternate portions of cold water and of ether, and dried for about 16 hours at room temperature (20°–30° C.) in a vacuum desiccator. The yield of dried 1,4-benzenedinitrile oxide amounts to 8 g. (80% of the theoretical). It is a pale yellow, powdery solid which does not melt upon heating to 265° C., polymerization occurring as the heating proceeds to and at this temperature.

The infrared spectrum of the purified dinitrile oxide exhibits strong peaks at 2310 cm.$^{-1}$, 1340 cm.$^{-1}$ and 1100 cm.$^{-1}$, these peaks being characteristic of aromatic nitrile oxides. No absorption occurs in the 1600 cm.$^{-1}$ region, indicating the absence of any furoxane condensation products. No detectable change occurs in the solid 1,4-benzenedinitrile oxide after standing at room temperature (20°–30° C.) for 3 months.

Analysis:

| | C | H | N |
|---|---|---|---|
| Calculated for $C_8H_4N_2O_2$, percent | 60.0 | 2.5 | 17.5 |
| Found, percent | 59.6 | 2.7 | 17.7 |

Example 2

PREPARATION OF 1,3-BENZENEDINITRILE OXIDE (XV)

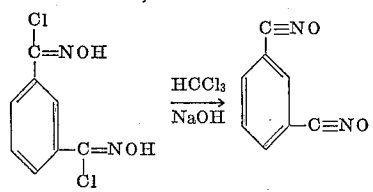

A suspension of 20 g. of isophthalhydroxamoyl chloride in 800 ml. of chloroform is cooled to −4° C. with stirring, and 160 ml. of 14% aqueous sodium hydroxide solution is added at such a rate that the temperature does not exceed +3° C. After standing for 10 minutes the organic layer is separated, washed five times with ice water, twice with cold saturated sodium chloride, and then dried over anhydrous calcium sulfate for 1 hour at 0° C. Filtration, evaporation of the solvent at reduced pressure and vacuum drying at 0° C. gives about 7.2 g. of the desired product, 1,3-benzenedinitrile oxide. The structure is characterized by elementary and infrared analyses.

Example 3

Ten (10) g. of a benzenedinitrile oxide, specifically 1,4-benzenedinitrile oxide, is added over a 35-minute period to a stirred solution of 6.7 g. of divinylsulfone (i.e., in approximately equal molar proportions or with a slight excess, e.g., up to about 10 mole percent excess of divinylsulfone) in 1500 ml. of dimethylformamide at room temperature (20°–30° C.). After standing for 3–4 hours, the resulting clear solution is poured into excess methanol to precipitate the copolymer containing essentially the recurring unit represented by Formula IV.

The precipitated copolymer is isolated by filtration. It is purified by dissolving it in dimethylformamide and reprecipitating in methanol, after which it is filtered off and vacuum-dried at 50° C. and 1 mm. pressure. The yield of dried copolymer is 11.7 g. (about 70% of the theoretical). Its intrinsic viscosity, $[\eta]$ in dimethylformamide at 30° C. is 0.37 dl./g. (for a definition of intrinsic viscosity see U.S. Patent No. 3,002,960, col. 3, lines 1–25). Infrared and elementary analyses confirm the structure as being essentially a 1:1 copolymer of 1,4-benzenedinitrile oxide and divinylsulfone; melting range, about 168°–183° C. It is a pale yellow powder. X-ray examination indicates that this polymer is about 70% crystalline in its structure.

The copolymer of this example, alone or admixed with conventional additives to molding compositions (e.g., dyes, pigments, organic or inorganic pigments, plasticizers, modifying resins, or other effect agents) is a moldable material. For instance, the unmodified copolymer can be compression-molded to a hard, molded article, e.g., a disc, bar, panel, etc., having a smooth surface and a nice appearance at 140° C. under a pressure of 2000 pounds per square inch.

Example 4

COPOLYMER OF 2-CHLOROBENZENE-1,3-DINITRILE OXIDE AND ALLYL ACRYLATE

Essentially the same procedure is followed as described uner Example 3 with the exception that, instead of 1,4-benzenedinitrile oxide and divinylsulfone, there are used approximately equal molar proportions of 2-chlorobenzene-1,3-dinitrile oxide and allyl acrylate. Similar results are obtained.

Example 5

COPOLYMER OF 3-METHYLBENZENE-1,4-DINITRILE OXIDE AND DIALLYL PHTHALATE

Same as in Example 4 with the exception that there are employed approximately equal molar proportions of 3-methylbenzene-1,4-dinitrile oxide and diallyl phthalate instead of the reactants used in Example 4. Similar results are obtained.

In a manner essentially the same as described under Examples 3, 4 and 5, copolymers are made from the following dinitrile oxides and ethylenically unsaturated materials. Solvents having better solubility characteristics with respect to the reactants than does dimethylformamide are used in specific copolymerization reactions when it is desired, for example, to accelerate the reaction, or to improve the yield, or to vary the molecular weight or for any other reasons.

| Example No. | Dinitrile Oxide | Ethylenically Unsaturated Monomer |
|---|---|---|
| 6 | 4-bromobenzene-1,3-dinitrile oxide | Vinyl acrylate. |
| 7 | 4-ethylbenzene-1,3-dinitrile oxide | Allyl methacrylate. |
| 8 | 2-amylbenzene-1,3-dinitrile oxide | Diallyl succinate. |
| 9 | 2-chloro-5-methyl-benzene-1,4-dinitrile oxide. | Diallyl phosphate. |
| 10 | 2,4-dichlorobenzene-1,3-dinitrile oxide. | Diallyl ether. |
| 11 | 2,4-dimethylbenzene-1,3-dinitrile oxide. | Dimethallyl ether. |
| 12 | 3-fluorobenzene-1,3-dinitrile oxide | Divinyl benzene. |
| 13 | 2,4,5-trichlorobenzene-1,3-dinitrile oxide. | Diallyl hexachlorophthalate. |

*Example 14*

COPOLYMER OF 1,4-BENZENEDINITRILE OXIDE AND METHYLENE BIS(ACRYLAMIDE)

The preparation of the above-identified copolymer is illustrated by the following equation:

(XVI)

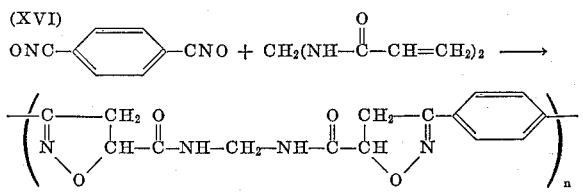

wherein $n$ is a number having an average value ranging, for example, from 2 to 1500 or more.

Fifty (50) g. of 1,4-benzenedinitrile oxide is added over a period of 40 minutes to a solution of 45.7 g. of methylene bis-acrylamide in 7.5 liters of dimethylformamide at room temperature (20°–30° C.). The reaction mass is poured into an excess of methanol to precipitate the copolymer, which is then isolated by filtration, washed and dried. The yield of dried copolymer amounts to 72 g. It is a white, crystalline powder;

$$[\eta]_{conc.}^{30°C.} \text{ H}_2\text{SO}_4 = 0.29$$

It is insoluble in organic solvents and does not melt upon heating to 320° C. Compression molding of this copolymer at 150° C. and 2000 p.s.i. yields a hard, yellowish, smooth-surfaced disk.

*Example 15*

COPOLYMER OF 1,4-BENZENEDINITRILE OXIDE AND ETHYLENE DIACRYLATE

The preparation of the above-identified copolymer is illustrated by the following equation:

(XVII)

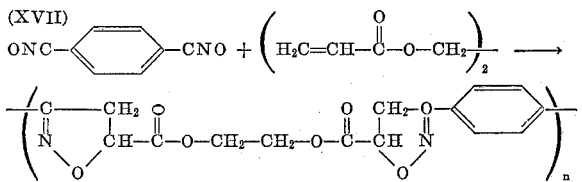

wherein $n$ is a number having an average value ranging, for example, from 2 to 1500 or more.

To a solution of 10.6 g. of ethylene diacrylate in 1500 ml. of dimethylformamide at room temperature (20°–30° C.) is added 10 g. of 1,4-benzenedinitrile oxide over a 20-minute period. After standing for 3–4 hours the polymer (copolymer) is precipitated by pouring the polymer solution into an excess of methanol. The precipitated polymer is purified by re-dissolving in dimethylformamide and re-precipitating with methanol as above-described, isolating by filtration and drying. The yield of dried, crystalline, purified copolymer amounts to 10 g. (about 50% of the theoretical). It has a melting range of 184°–193° C. and an intrinsic viscosity of 0.21 measured in dimethylformamide at 30° C. Compression molding of a sample into the form of a disk at 150° C. and 2000 p.s.i. gives a hard, yellowish, smooth-surfaced article.

*Example 16*

COPOLYMER OF 1,4-BENZENEDINITRILE OXIDE AND p-DIETHYNYLBENZENE

Twenty (20) g. of 1,4-benzenedinitrile oxide is added slowly to a solution of 16 g. of a diethynylbenzene, specifically p-diethynylbenzene, at room temperature (20°–30° C.) over a period of 1.75 hours. At the end of this period of time the reaction mass is poured into an excess of methanol to precipitate the copolymer that has formed. This copolymer contains essentially the recurring unit represented by Formula V.

After isolating the copolymer by filtration, it is washed with more methanol and then dried in vacuo. The yield of dried copolymer, which is an off-white powder, is 28 g. (80% of the theoretical). It does not melt when heated to 310° C. Its inherent viscosity determined from a 1% solution in 95% $H_2SO_4$ is 0.28. (For a definition of inherent viscosity see, for example, "Textbook of Polymer Chemistry," F. W. Billmeyer, Jr., page 128, Interscience Publishers, New York, N.Y., 1957). The excellent thermal stability of the copolymer is shown by the fact that only 10% of its weight is lost when heated in air to 428° C. Compression molding of a sample into the form of a disk at 100° C. and a pressure of above 2000 p.s.i. yields a hard, glassy article having excellent thermal stability and a nice appearance.

*Example 17*

COPOLYMER OF 1,4-BENZENEDINITRILE OXIDE AND TRIMER OF 1-HEPTYNE

Essentially the same procedure is followed as described under Example 16 with the exception that, instead of p-diethynylbenzene, there is used an equivalent amount of a trimer of 1-heptyne in the form of a mixture of isomers, which isomeric mixture is prepared and isolated as described under Example 1 of the aforementioned Merriwether Patent No. 2,961,330. In one of its isomeric forms this trimer of 1-heptyne has the structural formula (XVIII)
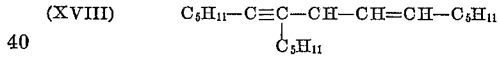

from which it is seen that it contains both ethylenic and acetylenic bonds in its molecule.

The resulting copolymer is moldable under heat and pressure in the same general manner as the copolymers of the other examples.

*Example 18*

COPOLYMER OF 1,4-BENZENEDINITRILE OXIDE AND ETHYLENE DIACRYLATE

This example illustrates the preparation of the above-identified copolymer by a method different from that employed in Example 15, namely, by forming the dinitrile oxide reactant in situ rather than by using preformed 1,4-benzenedinitrile oxide.

To a stirred solution of 10.6 g. of ethylene diacrylate and 12.7 g. of triethylamine in 1500 ml. of dimethylformamide at room temperature (20°–30° C.) is added 15 g. of terephthalhydroxamoyl chloride over a 20-minute period. 1,4-benzenedinitrile oxide forms in situ and, as it forms, copolymerizes with the ethylene diacrylate. The reaction mass is then allowed to stand for 3–4 hours at room temperature in order to allow the copolymerization reaction to proceed to substantial completion. The resulting polymer (copolymer) is isolated, purified and dried in the same manner as described in Example 15. It has essentially the same characteristics and can be molded in the same manner as the product of Example 15 to form a hard, yellowish, smooth-surfaced article.

I claim:

1. A composition comprising a copolymer of (1) a dinitrile oxide represented by the general formula

wherein Ar represents a divalent radical selected from the class consisting of divalent unsubstituted aromatic hydrocarbon radicals, divalent chlorinated aromatic hydrocarbon radicals, divalent brominated aromatic hydrocarbon radicals and divalent lower alkyl-substituted aromatic hydrocarbon radicals and each —CNO group in the above formula being directly bonded through its carbon to a carbon atom of the aromatic nucleus, and (2) an unsaturated organic material selected from the group consisting of ethylenic compounds of the formula $$H_2C=CH—R—CH=CH_2$$

and acetylenic compounds of the formula $$HC≡C—R—C≡CH$$

wherein R is the divalent residue of said organic material, said copolymer having in its backbone a recurring linkage which is a member of the group consisting of

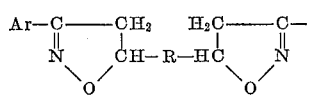

and

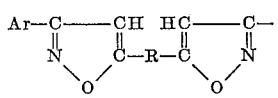

wherein Ar and R are as defined above and having a degree of polymerization within the range of from 2 to 1500.

2. A composition as in claim 1 wherein the unsaturated organic material of (2) contains at least one $CH_2=C<$ grouping.

3. A composition as in claim 1 wherein the unsaturated organic material of (2) contains two and only two $CH_2=CH—$ groupings.

4. A composition as in claim 1 wherein Ar represents phenylene.

5. A composition comprising a copolymer of (1) a dinitrile oxide having the formula $$ONC—C_6H_4—CNO$$

and (2) an unsaturated organic material selected from the group consisting of ethylenic compounds of the formula $$H_2C=CH—R—HC=CH_2$$

and acetylenic compounds of the formula $$HC≡C—R—C≡CH$$

wherein R is the divalent residue of said organic material, said copolymer having in its backbone a recurring linkage which is a member of the group consisting of

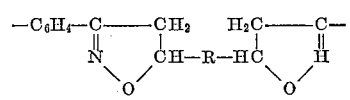

and

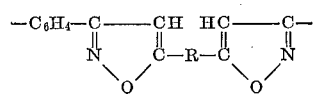

wherein R is as defined above and having a degree of polymerization within the range of from 2 to 1500.

6. A composition as in claim 5 wherein the unsaturated organic material of (2) is one which contains two $Ch_2=C<$ groupings.

7. A composition as in claim 5 wherein the unsaturated organic material of (2) is one which contains two $CH_2=CH—$ groupings.

8. A copolymer of benzenedinitrile oxide and divinylsulfone and containing the grouping

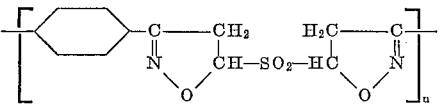

wherein $n$ has an average value within the range of from 2 to 1500.

9. A copolymer of benzenedinitrile oxide and methylene bis-acrylamide and containing the grouping

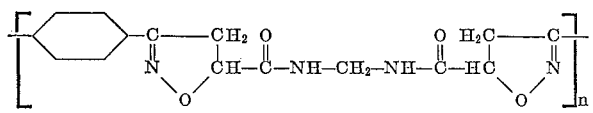

wherein $n$ has an average value within the range of from 2 to 1500.

10. A copolymer of benzenedinitrile oxide and ethylene diacrylate and containing the grouping

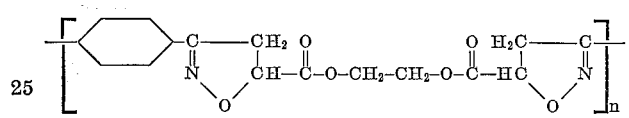

wherein $n$ has an average value within the range of from 2 to 1500.

11. A copolymer of benzenedinitrile oxide and diethynlbenzene and containing the grouping

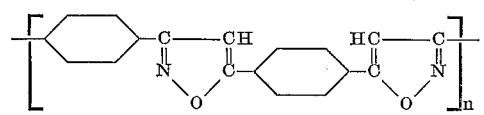

wherein $n$ has an average value within the range of from 2 to 1500.

12. The method which comprises copolymerizing, in an inert, liquid, reaction medium and at a temperature within the range of from −30° C. to +200° C., (1) a dinitrile oxide represented by the general formula $$ONC—Ar—CNO$$

wherein Ar represents a divalent radical selected from the class consisting of divalent unsubstituted aromatic hydrocarbon radicals, divalent chlorinated aromatic hydrocarbon radicals, divalent brominated aromatic hydrocarbon radicals and divalent lower alkyl-substituted aromatic hydrocarbon radicals, and each —CNO group in the above formula being directly bonded through its carbon to a carbon atom of the aromatic nucleus, and (2) an unsaturated organic material containing at least two reactive sites of the group consisting of ethylenic and acetylenic bonds; and isolating the resulting copolymer from the reaction mass.

13. A method as in claim 12 wherein the divalent radical represented by Ar in the formula for the dinitrile oxide is phenylene.

14. A method as in claim 12 wherein the divalent radical represented by Ar in the formula for the dinitrile oxide is phenylene and the inert, liquid, reaction medium is dimethylformamide.

15. A method as in claim 12 wherein the dinitrile oxide of (1) and the unsaturated organic material of (2) are employed in the ratio of from 1.0 to 5.0 chemical equivalents of the former per chemical equivalent of the latter.

16. A method as in claim 12 wherein the dinitrile oxide of (1) and the unsaturated organic material of (2) are employed in the ratio of from 1.0 to 1.1 chemical equivalents of the former per chemical equivalent of the latter.

17. A method as in claim 12 wherein the organic material of (2) contains at least one $CH_2=C<$ grouping and is employed in the ratio of from 1.2 to 2.0 chemical equivalents of the said organic material per chemical equivalent of the dinitrile oxide of (1).

18. The method which comprises copolymerizing, by bringing into reactive relationship in dimethylformamide at a temperature of from 10° C. to 40° C., (1) benzenedinitrile oxide and (2) an unsaturated organic material containing two and only two $CH_2=CH-$ groupings and no other unsaturated groupings, the benzenedinitrile oxide of (1) and the unsaturated organic material of (2) being employed in the ratio of from 1.0 to 1.1 chemical equivalents of the former per chemical equivalent of the latter; and isolating the resulting copolymer from the reaction mass.

No references cited.

JOSEPH L. SCHOFER, *Primary Examiner.*

W. H. SHORT, *Examiner.*

UNITED STATES PATENT OFFICE
CERTIFICATE OF CORRECTION

Patent No. 3,213,068                          October 19, 1965

Everett J. Frazza

It is hereby certified that error appears in the above numbered patent requiring correction and that the said Letters Patent should read as corrected below.

column 2, lines 56 to 59, the formulas should appear as shown below instead of as in the patent:

column 3, line 72, for "with" read -- without --; column 9, lines 54 to 58, the formula should appear as shown below instead of as in the patent:

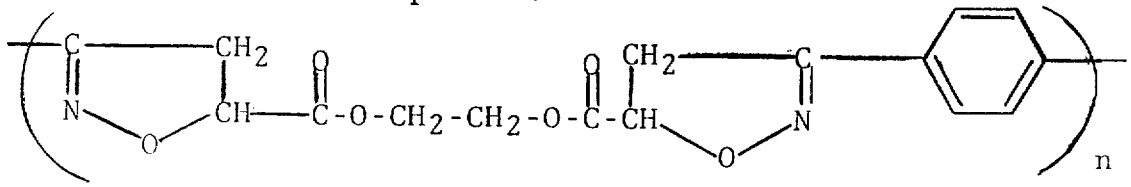

column 10, lines 38 to 41, formula (XVIII) should appear as shown below instead of as in the patent:

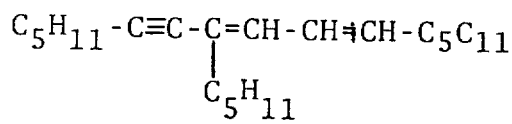

con't 3,213,068 column 11, lines 56 to 60, the formula should appear as shown below instead of as in the patent:

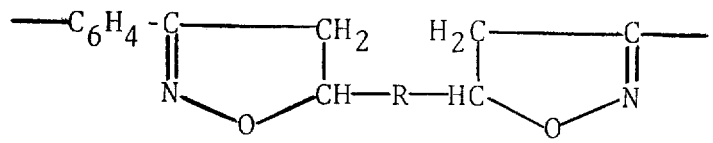

Signed and sealed this 13th day of September 1966.

(SEAL)
Attest:

ERNEST W. SWIDER
Attesting Officer

EDWARD J. BRENNER
Commissioner of Patents